May 20, 1952  A. RAPPL  2,597,672
ACCESSORY SYSTEM
Filed Jan. 27, 1947  3 Sheets-Sheet 1

INVENTOR
Anton Rappl
BY
Beau, Brooks, Buckley & Beau.
ATTORNEYS

May 20, 1952 A. RAPPL 2,597,672
ACCESSORY SYSTEM

Filed Jan. 27, 1947 3 Sheets-Sheet 2

INVENTOR
*Anton Rappl*
BY
*Bean, Brooks, Buckley + Bean.*
ATTORNEYS

May 20, 1952          A. RAPPL          2,597,672

ACCESSORY SYSTEM

Filed Jan. 27, 1947          3 Sheets-Sheet 3

INVENTOR
Anton Rappl
BY
Beau, Brooks, Buckley & Beau.
ATTORNEYS

Patented May 20, 1952

2,597,672

UNITED STATES PATENT OFFICE 2,597,672

ACCESSORY SYSTEM

Anton Rappl, Eggertsville, N. Y., assignor to Trico Products Corporation, Buffalo, N. Y.

Application January 27, 1947, Serial No. 724,569

6 Claims. (Cl. 230—52)

This invention relates to a motor vehicle adjunct and particularly to a unit for association with the vehicle power plant, to be operated by a source of low pressure therein for producing a superatmospheric pressure and thereby constitute a source of positive pressure for the actuation of motor vehicle accessories or for the inflation of the tires of the vehicle.

The object of the present invention is to provide a pump unit of this nature which will operate on a minimum pressure differential, and serve to provide a positive pressure sufficient for the intended use.

Further, the aim of the invention is to provide a unit of this character which is of simple and economical construction and at the same time one which is practical and durable in operation.

The foregoing and other objects will manifest themselves as the description progresses, reference being had to the accompanying drawings, wherein.

Figures 4, 5:
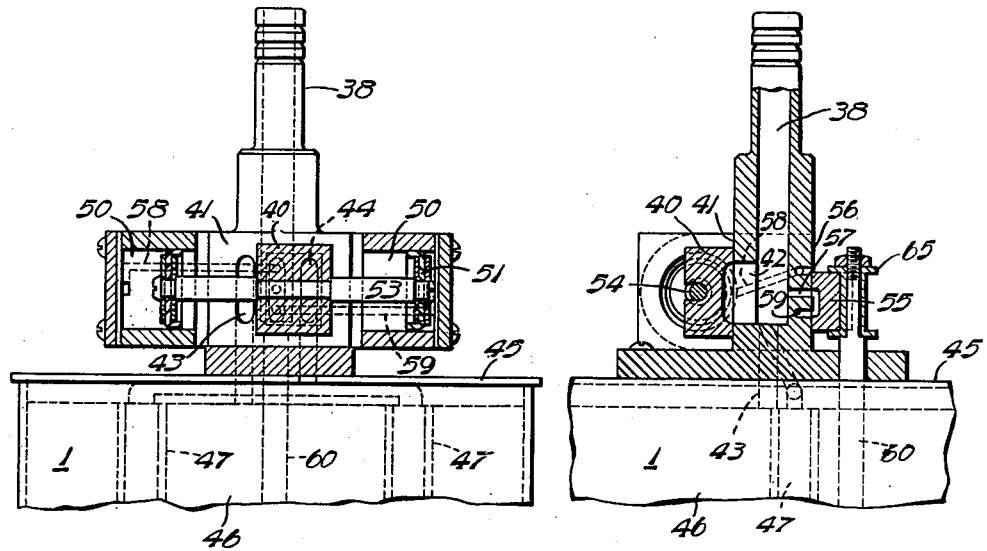
Figure 3:
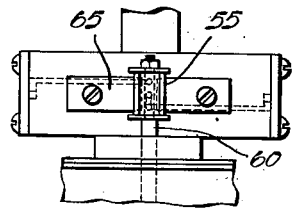
Figure 6:
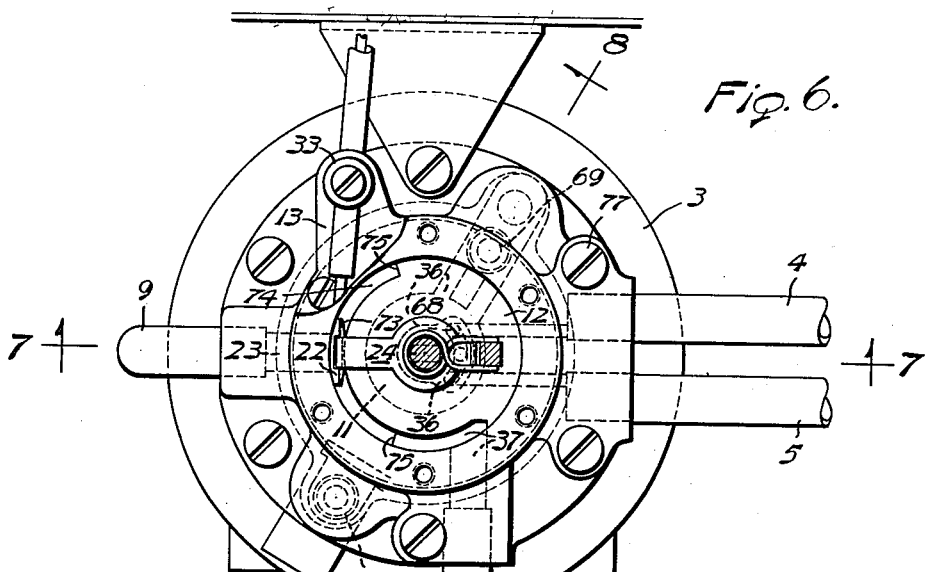
Figure 7:
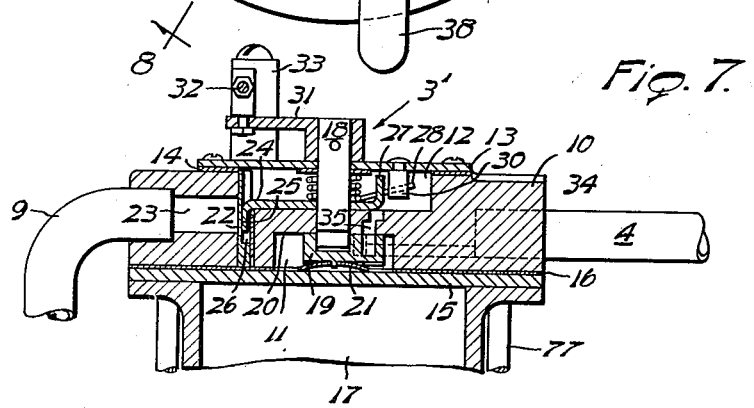
Figure 8:
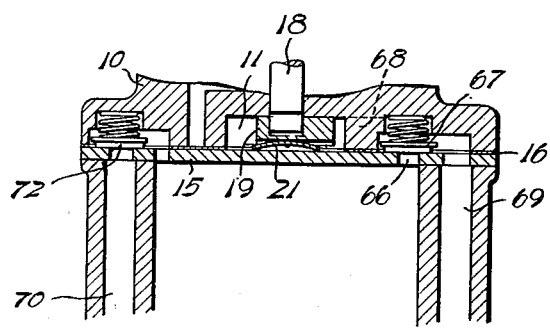

Figs. 3, 4 and 5 are detailed views of the automatic valve mechanism forming a part of the motor portion of the unit; and Figs. 6, 7 and 8 are detailed views of a modification showing the selective control valve associated with the pump portion of the unit, Figs. 7 and 8 being cross sectional views on lines 7—7 and 8—8, respectively, of Fig. 6.

Referring more particularly to the drawings, the numeral 1 designates the motor portion and 2 the pump portion of the unit. The numeral 3 designates the control valve which selectively connects the fluid lines 4 and 5 to the accessory motor 6. This motor may be used for any desired purpose such as for raising and lowering the callapsible top 7 of a convertible vehicle as has been more clearly set forth in my copending application filed on even date herewith under Serial No. 724,570, now abandoned. The intake manifold 8 serves by way of example as a source of suction or negative pressure and this source is placed in communication with the control valve 3 by means of conduit 9.

Figure 1:
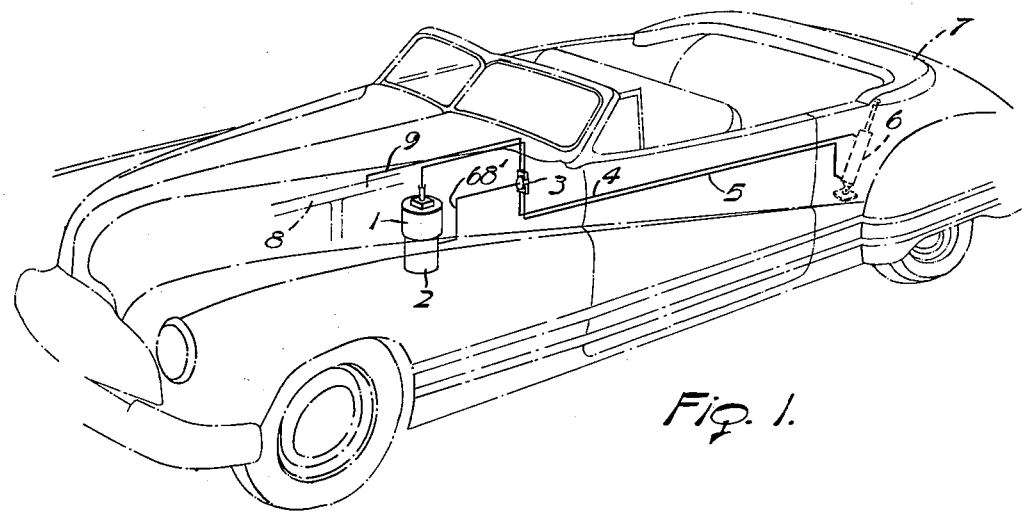
Fig. 1 is a phantom view of a motor vehicle showing the unit arranged beneath the engine hood.

The control valve may be made separate from the unit and mounted upon a convenient part of the vehicle, as shown in Fig. 1, but preferably it forms a part of the unit by being carried directly on the same at the pump end thereof, as depicted at 3' in Figs. 6, 7 and 8. To this end the pump 2 has a removable head 10 of special design, the same being cast with a pressure chamber 11 in one face and a suction chamber 12 in its opposite face. The suction chamber may be closed by a cover plate 13 and a sealing gasket 14, while the pressure chamber 11 is closed by a body plate 15 and an interposed sealing gasket 16. The body plate may constitute the end wall of the pump chamber 17, as will be more fully described hereinafter.

Journaled in the removable head or body 10 is a shaft 18 which has its inner end extending into the pressure chamber 11 to interlock with a valve 19, which in turn is held upon its seat 20 by a spring 21. Where the shaft extends through the suction chamber 12 it carries a valve 22 for closing off the suction supply port 23, said valve being connected to the shaft by an arm 24 which has its outer end formed with a tongue 25 detachably engaged in a recess 26 formed in said valve 22. The arm 24 is fixed to turn with the shaft 18 and has a lug 27 engaging between the parallel ends 28 of a coil spring 29. A stop part 30 on the cover 13 also engages between the spring ends to anchor one end while the lug 27 angularly displaces the opposite end during a valve shifting movement of the arm 24. Obviously, when the arm is released the spring will act upon the lug 27 to return the connected valve 22 to its normal port closing position.

The outer end of the shaft 18 carries an arm 31 to which a flexible wire 32 is connected, the flexible armor of the wire being supported by a post 33 on the cover plate 13. By simply pushing or pulling the wire, the shaft will be turned clockwise or counterclockwise to uncover the port 23 and to shift the valve 19 to one or the other of two operative positions wherein it will position its port connecting recess 34 to provide communication between the central port 35, from the suction chamber 12, and a selected one of the accessory ports 36 while exposing the companion accessory port to the pressure chamber 11. The ports 36 open into the pipe lines or conduits 4 and 5, respectively. The central port 35 extends through the partition wall between the two chambers 11 and 12 and opens into the suction chamber 12 so that when suction maintains within such chamber it will be transmitted through the port and the valve recess 34 to one or the other of the accessory ports 36. The manifold connection 9 opens into the suction chamber 12 through the port 23.

A port 37 communicates through a pipe 38 with a pressure transposing valve mechanism which comprises a valve 40 slidable on a seat 41 over ports 42, 43 and 44. The port 42 opens from the passage 38 while the ports 43 and 44 open into the opposite ends of the motor cylinder 46. In the arrangement shown the automatic valve mechanism is carried directly by the cylinder head 45. Therefore, the port 43 may open through the head directly into the motor chamber 46, while the port 44 will have communication with the opposite end of the motor chamber by means of the interiorly disposed tubes 47 which bypass the piston 48 by extending through the same, opening at the far side thereof into the chamber through holes 49. Therefore, by shifting the valve 40 from one to the other of its two operative positions the suction chamber 12 will be placed in communication alternately with the opposite ends of the piston chamber 46.

In order to effect this valve shifting operation with a minimum pressure differential and thereby maintain the motor operative throughout longer periods, such as when the suction influence from the intake manifold is small, an auxiliary fluid pressure motor is provided to avoid the use of snap-over springs which latter require the expenditure of considerable energy. To this end the head 45 has a part formed with opposed cylinders 50 in which operates a tandem piston 51, the two piston parts thereof being connected by a stem 53 which interlocks with the valve 40, as shown at 54, to actuate the same. The piston rod 53 thereby serves to support the valve as well as to shift it back and forth on its seat 41. The auxiliary motor is operatively connected to the passage 38 by a valve 55 which slides upon the seat 56 to connect the supply port 57 alternately to the opposed cylinder ports 58 and 59. The port 58 opens into the left cylinder 50, as viewed in Fig. 4, while the port 59 establishes communication with the remote end of the right cylinder. Consequently, when the valve 55 is shifted on its seat the auxiliary motor will be energized to move its valve 40 for effecting operation of the pump actuating motor 1. The valve 55 is connected by a rod 60 to the motor piston 48 by a play connection in which the rod slides through the piston and has a head 61 alternately engaging opposed shoulders on the piston, as the latter moves back and forth between its limits of movement, for moving the rod axially to effect shifting of the valve. In the illustrated embodiment the head slides in a bore 62 which is formed in a piston rod 63 that connects the motor piston to the pump piston 64. The motor piston 48 is relatively larger than the pump piston both constituting parts of a differential piston unit. The valve 55 may be supported by and between opposed guide blocks 65.

In operation, movement of the flexible wire 32 in one direction or the other will accordingly move the arm 31 to initially uncover the suction port 23 which does two things. First, the suction influence will be transmitted through the passage 37 and tube 38 to the automatic valve mechanism to operate the motor piston 48. Second, the suction influence will be transmitted through the port 35 to the connected side of the accessory 6. The superatmospheric pressure from the now operating pump will be delivered to the pressure chamber 11 and through the exposed or uncovered port 36 to the opposite side of the accessory motor for providing increased pressure differential to insure prompt response of the latter. This pumped air is delivered through ports 66 at the opposite ends of the pump cylinder, past check valves 67 and through a connecting passage 68 to the pressure chamber 11, the remote port 66 communicating with the connecting passage by means of a longitudinally extending bore 69 in the cylinder wall. A like bore 70 is provided at the inlet side of the pump into which filtered air flows through a lateral opening 71. Spring seated check valves 72 determine the direction of fluid flow.

Figure 2:
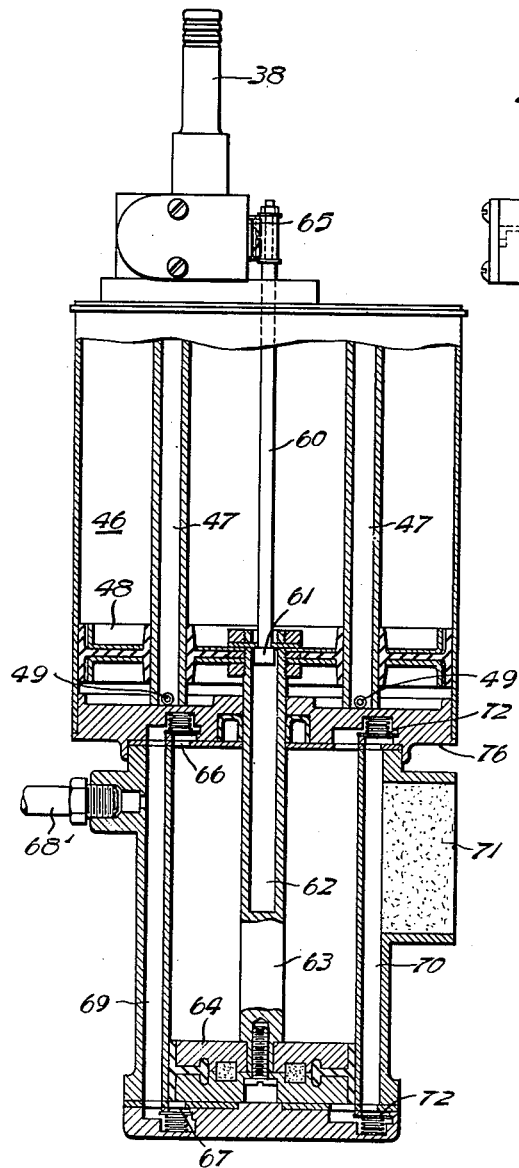
Fig. 2 is a longitudinal sectional view through the unit, with parts remaining in elevation.

In the embodiment shown in Figs. 1 and 2 the pumped air is delivered from the pump 2 through a conduit 68' to the remotely arranged control valve 3. Upon releasing the arm 31 the spring 29 will restore the valve 22 to its normal port closing position. The valve 22 will be held to its seat by the pressure differential acting thereon although a bowed flat spring 73 may be provided for this purpose. In this connection it will be observed that the valve 22 moves in an arcuate slot 74, the ends of which form stops 75 for limiting the extent of valve movement. The port 37 opens into such arcuate slot as is shown most clearly in Fig. 6. If desired, the connecting passage 68' may be disconnected from the control valve 3 and employed for inflating a tire, for which purpose a rubber hose may be conveniently attached.

As the piston 48 of the motor 1 approaches one limit of movement it will actuate the valve shifting rod 60 to shift the valve 55 for the auxiliary motor. This will cause the auxiliary motor to shift the main valve 40 for reversing the pressure differential on the motor piston 48 whereupon the pump piston will be reversed in its movement.

The combined motor and pump unit is compact and readily assembled, the two cylinders being coaxially arranged and supported by a common head 76, following which the end heads 10 and 45 will be arranged in place. The pump head 10 and body plate 15 may be secured to the common head 76 by long bolts 77 while the motor heads will be suitably anchored in place, as by a tight frictional fit, in view of the low pressure maintaining in the motor chamber.

The foregoing description has been given in detail for clarity and with no though of limiting the scope of the invention since the inventive principles involved are capable of assuming other physical embodiments without departing from the spirit of the invention as defined in the appended claims.

What is claimed is:

1. A pump unit having a motor chamber and a pump chamber with a piston in each chamber connected by a rod for movement in unison, automatic valve mechanism for operatively applying the operating suction to the motor piston, and a control valve arranged in the suction supply line and operable to open communication to the automatic valve mechanism, said control valve having high and low pressure accessory ports with means for concurrently connecting the suction line to one port and the pump pressure output to the other port for providing a pressure differential in the two accessory ports.

2. A pump unit having a motor chamber and a pump chamber with a piston in each chamber connected by a rod for movement in unison, automatic valve mechanism carried by one chamber for operatively applying an operating pressure differential to the motor piston for actuating the same, and a control valve carried by the companion chamber and having a suction chamber and a pressure chamber, the latter chamber being connected to the pump discharge, the suction chamber having a suction supply port normally closed by a valving member and also having a constantly open communication with the automatic valve mechanism whereby when the valving member is open suction will be supplied to the motor for operating the same.

3. A pump unit having a motor chamber and a pump chamber with a piston in each chamber connected by a rod for movement in unison, automatic valve mechanism carried by one chamber for operatively applying an operating pressure differential to the motor piston for actuating the same, a control valve having a suction chamber and a pressure chamber, the latter chamber being connected to the pump discharge, the suction chamber having a suction supply port normally closed by a valving member and also having a constantly open communication with the automatic valve mechanism whereby when the valving member is open suction will be supplied to the motor for operating the same, said pressure chamber having suction and pressure accessory ports, said suction chamber having a second port, valve means selectively operable to connect said second port with either accessory port while uncovering the companion accessory port to the pressure chamber, said pump having its delivery leading into the pressure chamber to maintain a superatmospheric pressure condition therein.

4. A suction operated pump unit comprising coaxially arranged cylinders of different diameters with a common head therebetween, a differential piston assembly slidable in the cylinders and having bearing support in the head, to provide a fluid motor and a relatively smaller pump, the latter having inlet and outlet ports, automatic valve mechanism for the motor utilizing an auxiliary fluid motor to shift the valving member thereof back and forth between two operative positions for effecting operation of the first motor, and a control valve having a suction chamber with a suction supply port and a second port connected to the automatic valve mechanism, said control valve also having a second chamber with inlet and outlet ports, said suction chamber having a third port, with valve means for opening and closing the supply port and selectively connecting said third port to one or the other of the inlet and outlet ports of the second chamber, the outlet port of the pump discharging into the second chamber of the control valve to supply its unconnected one of said inlet and outlet ports with pressure.

5. A motor pump unit comprising coaxially arranged motor and pump chambers with a common head therebetween, a piston in each chamber connected through the head to the companion piston for movement in unison, automatic valve mechanism arranged on the remote end of the motor chamber and having a port opening directly into the motor chamber at the near side of its piston, a communication tube extending from the mechanism and through the motor piston in fluid seal contact therewith with the outer end of the tube being in communication with the motor chamber at the far side of its piston, said tube constituting a guiding support for the motor piston, a control valve having a pressure chamber receiving the discharge from the pump and a suction chamber into which opens a suction supply port, valve means normally closing the supply port, there being a normally open passage between the suction chamber and the automatic valve mechanism and a second passage from the suction chamber, said pressure chamber having a pair of ports, and a valve operable by and during operation of the valve means for selectively connecting said second passage to the ports of said pair.

6. A motor pump unit comprising coaxially arranged motor and pump chambers with a common head therebetween, a piston in each chamber connected through the head to the companion piston for movement in unison, automatic valve mechanism arranged to the remote end of the motor chamber and having a port opening directly into the motor chamber at the near side of its piston, a communication tube extending from the mechanism and through the motor piston in fluid seal contact therewith with the outer end of the tube being in communication with the motor chamber at the far side of its piston, said tube constituting a guiding support for the motor piston, a removable head for the outer end of the pump chamber, said removable head having a pressure chamber and a suction chamber therein, a suction supply port opening into the suction chamber, a valve for opening and closing the supply port, a delivery passage from the pump into the pressure chamber, two ports opening into the pressure chamber, and a valve for selectively connecting the suction chamber to one or the other of the pressure chamber ports and concurrently establishing communication between the pressure chamber and the unconnected one of said pressure chamber ports.

ANTON RAPPL.

REFERENCES CITED

The following references are of record in the file of this patent:

UNITED STATES PATENTS

| Number | Name | Date |
|---|---|---|
| 1,488,171 | Savidge | Mar. 25, 1924 |
| 1,600,384 | Aikman | Sept. 21, 1926 |
| 1,694,279 | Oishei | Dec. 4, 1928 |
| 1,894,055 | Perkins | Jan. 10, 1933 |
| 1,951,030 | Mardone | Mar. 13, 1934 |
| 2,298,628 | Redd | Oct. 13, 1942 |